(12) United States Patent
Mishra et al.

(10) Patent No.: US 12,541,523 B2
(45) Date of Patent: Feb. 3, 2026

(54) CONTEXT DRIVEN ANALYTICAL QUERY ENGINE WITH VISUALIZATION INTELLIGENCE

(71) Applicant: Lumenore Inc, Madison Heights, MI (US)

(72) Inventors: Jitendra Mishra, Bhopal (IN); Saurabh Mishra, Bhopal (IN); Rahul Soni, Bhopal (IN); Anurag Shrivastava, Bhopal (IN)

(73) Assignee: Lumenore Inc

( * ) Notice: Subject to any disclaimer, the term of this patent is extended or adjusted under 35 U.S.C. 154(b) by 198 days.

(21) Appl. No.: 18/162,723

(22) Filed: Feb. 1, 2023

(65) Prior Publication Data

US 2024/0256554 A1 Aug. 1, 2024

(51) Int. Cl.
*G06F 16/2457* (2019.01)
*G06F 16/242* (2019.01)
*G06F 16/28* (2019.01)

(52) U.S. Cl.
CPC .... *G06F 16/24575* (2019.01); *G06F 16/2425* (2019.01); *G06F 16/287* (2019.01)

(58) Field of Classification Search
CPC ............. G06F 16/24575; G06F 16/287; G06F 16/2425
See application file for complete search history.

(56) References Cited

U.S. PATENT DOCUMENTS

| 2017/0308536 | A1* | 10/2017 | Azzam | G06F 16/248 |
| 2018/0075092 | A1* | 3/2018 | Hernandez Sanchez | G06F 16/24578 |
| 2020/0387823 | A1* | 12/2020 | Yao | G06F 3/0481 |
| 2021/0117416 | A1 | 4/2021 | Sriharsha et al. | |

* cited by examiner

*Primary Examiner* — Apu M Mofiz
*Assistant Examiner* — Husam Turki Samara

(57) ABSTRACT

A method for performing context-based analysis using a processor is disclosed. The method is initialized when the processor receives a first query from a first user on a first user device. Further, processor is configured to send the first query from the first user device using metadata from a database management system over a network. The sent first query is analyzed. The processor is configured to analyze the first query and determine a first context of the first query to generate a first user metadata based on the first context. Further, the processor is configured to identify the key performance indicators (KPIs) in the first user metadata using an intelligent visualization configuration. The processor is configured to use the intelligent visualization configuration to generate a first visual representation of the identified KPIs.

4 Claims, 9 Drawing Sheets

CONTEXT DRIVEN ANALYTICAL QUERY ENGINE WITH VISUALIZATION INTELLIGENCE

FIELD OF THE INVENTION

The subject matter in general relates to the field of information technology, and in particular to data analytics for driving an analytical query engine.

BACKGROUND OF THE INVENTION

An analytical query engine finds application in almost every business across the globe for fetching and combining data from the same or different data sources using structured query language. The query engine is designed to independently analyse data from different data sources based on user inputs. The analysis is based on keywords recognised by a processor configured to execute a pre-programmed application. For example, consider an end user checking for sales of a particular commodity using a natural language as input. The existing analytical query engines use software programs that associate the end user's input clause to a corresponding query in structured query language that has already been stored in a pre-programmed application. Accordingly, the current query engines provide an output data corresponding to the data sources linked to the pre-programmed application but fails to provide the output when the user query is beyond the purview of the linked data sources.

The conventional analytical query engines are not configured to understand the context and analyse all the data sources in the network and automatically generate another relevant query in a structured query language. The conventional analytical query engines fail to generate queries which are driven by the persona of user by learning user behavior and context of query. Also, the current analytical query engines fail to automatically generate multiple queries in the structured query language (SQL) for user queries that are input using the natural language.

In view of the foregoing discussion, there is a need to understand the context of the users' input, persona of the user comprising all required metadata available and build an SQL query dynamically, execute it in desired database and return the output with an intelligent visualization that provides a clear understanding of the derived output.

SUMMARY OF THE INVENTION

An embodiment discloses a method for performing context-based analysis using a processor. The method is initialized when the processor receives a first query from a first user on a first user device. Further, the method includes sending the first query from the first user device to access metadata from a database management system over a network. The sent first query is analysed to determine a first context of the first query. Further, the method includes determining the first context of the first query for generating a first user metadata based on the first context. Further, the method includes identifying the key performance indicators in the first user metadata using an intelligent visualization configuration. The processor is configured to use the intelligent visualization configuration to generate a first visual representation of the identified KPIs.

BRIEF DESCRIPTION OF DRAWINGS

Exemplary embodiments of the present invention will be understood and appreciated more fully from the following detailed description, taken in conjunction with the drawings in which.

DETAILED DESCRIPTION OF THE INVENTION

The following detailed description includes references to the accompanying drawings, which form part of the detailed description. The drawings show illustrations in accordance with example embodiments. The numerals in the figure represent like elements throughout the several views, exemplary embodiments of the present disclosure are described. For convenience, only some elements of the same group may be labelled with numerals. The purpose of the drawings is to describe exemplary embodiments and not for production.

Therefore, features shown in the figures are chosen for convenience and clarity of presentation only. Moreover, the language used in this disclosure has been principally selected for readability and instructional purposes and may not have been selected to delineate or circumscribe the inventive subject matter, resort to the claims being necessary to determine such inventive subject matter. These example embodiments are described in enough details to enable those skilled in the art to practice the present subject matter. However, it will be apparent to one of ordinary skill in the art that the present invention may be practiced without these specific details. The embodiments can be combined, other embodiments can be utilized, or structural and logical changes can be made without departing from the scope of the invention. The following detailed description is, therefore, not to be taken as a limiting sense.

In this document, the terms "a" or "an" are used, as is common in patent documents, to include one or more than one. In this document, the term "or" is used to refer to a non-exclusive "or," such that "a or b" includes "a but not b," "b but not a," and "a and b," unless otherwise indicated.

Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Figure 1:
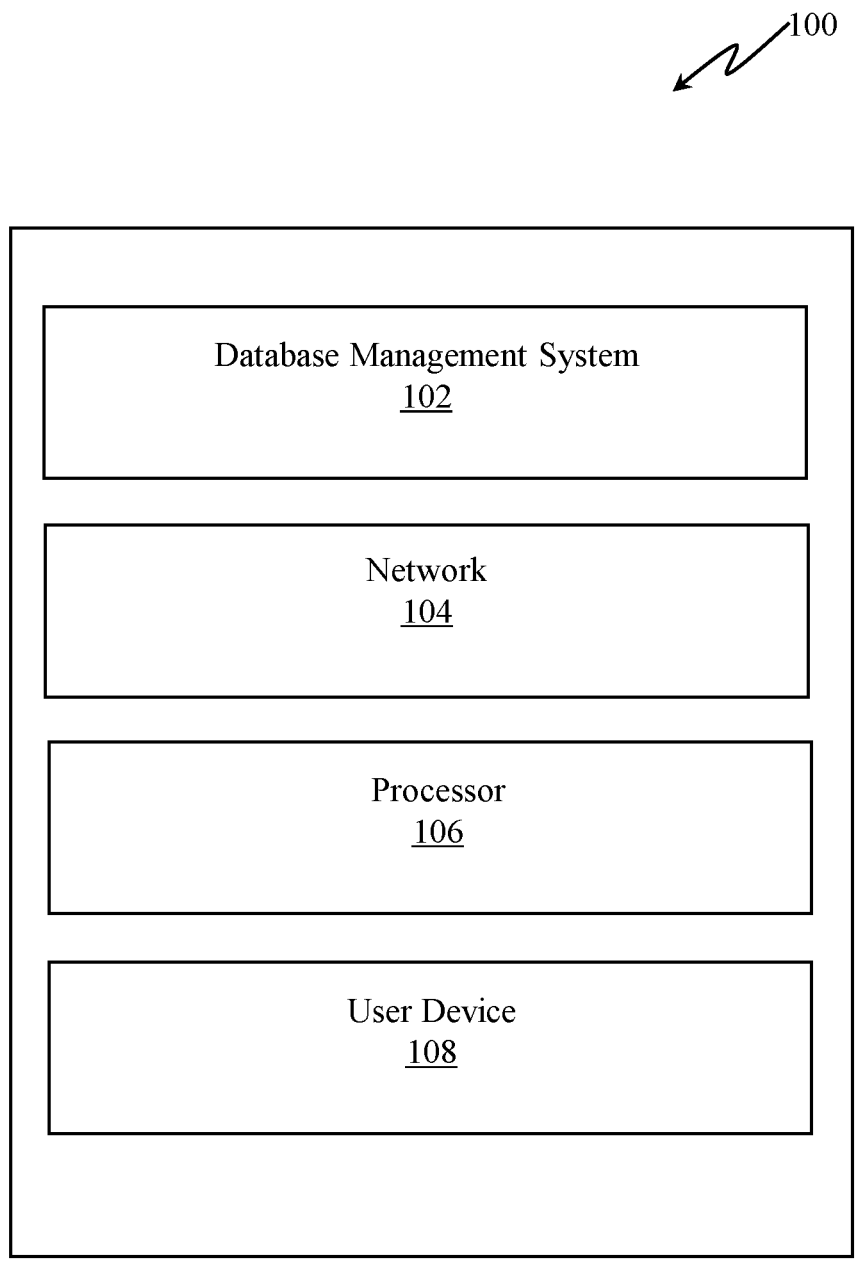
FIG. 1 illustrates a block diagram illustrating an analytical query engine 100, in accordance with an embodiment.

FIG. 1 illustrates a block diagram illustrating an analytical query engine 100. The analytical query engine 100 may comprise metadata from a database management system (DBMS) 102, a network 104, a processor 106 and a user device 108. The analytical query engine 100 may be capable of understanding a user's input obtained from the user device 108 using the processor 106 along with all required metadata available in the DBMS 102. The processor 106 may be configured to process the user's input and build a dynamic query, execute it using the desired metadata from DBMS 102 and return the output using an intelligent visualization configuration. The analytical query engine 100 may be configured to dynamically build a query in a structured query engine (SQL), that may require necessary metadata information.

The processor 106 may be configured to receive the user's query through the user device 108. The processor 106 may analyze the user query using metadata from the DBMS 102 and create an SQL query to return an output with intelligence of visualization. The processor 106 may be implemented in the form of one or more processors and may be implemented as appropriate in hardware, computer-executable instructions, firmware, or combinations thereof. Computer-executable instruction or firmware implementations of the processor 106 may include computer-executable or machine-executable instructions written in any suitable programming language to perform the various functions described.

Figure 2:
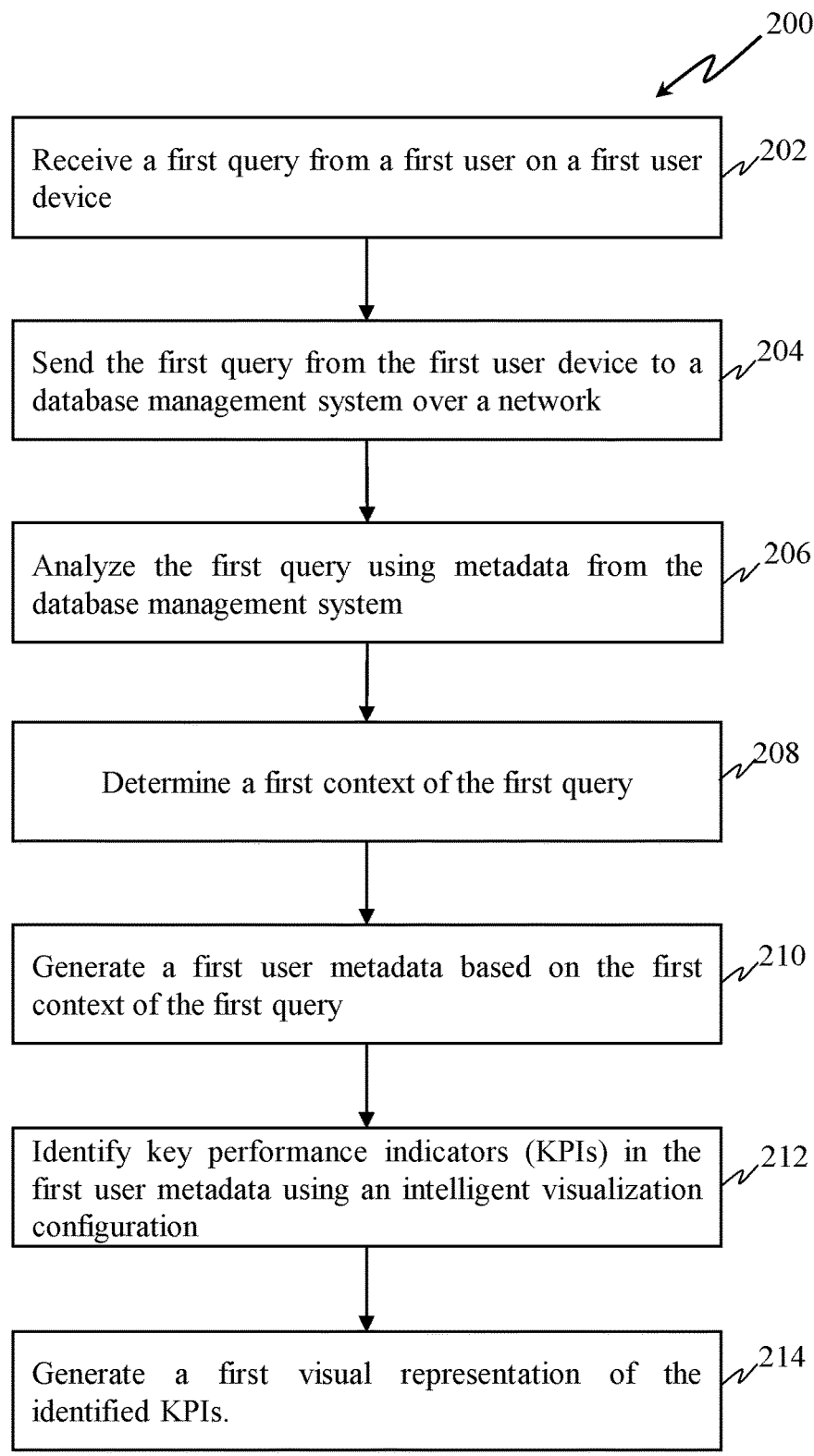
FIG. 2 is a flowchart 200 depicting a method for performing context-based data analysis, in accordance with an embodiment.

FIG. 2 is a flowchart 200 depicting a method for performing context-based data analysis. The analytical query engine 100 may use the processor 106 for analyzing high volume of data with ease to generate the output based on the context of the input query.

At step 202, the processor 106 may be configured to receive a first query as the input from a first user on the first user device 108. The first user device 108 may include any smart device connected to the network 104. Furthermore, the first query may be related to any enquiry regarding sales, an individual's track record in his/her career, or health record of an individual, etc. The first user may input the first query in any natural language that can be comprehended by the first user device 108.

Referring to FIG. 2, At step 204, the processor 106 may send the first query from the user device 108 to the DBMS 102 over the network 104. Further, at step 206, the processor 106 and may be configured to analyze the first query using metadata from the DBMS 102. The information in the metadata may include user metadata and functional metadata. The user metadata may include a preference, context, persona, and security role of the user. The functional metadata may include configurations, schema metadata, data values and algorithms associated with the analytical query engine.

At step 208, the processor 106 may be configured to determine a first context of the analyzed first query. Furthermore, the processor 106 may use the metadata from DBMS 102 to generate a first user metadata based in the first context of the first query at step 210. At step 212, the processor 106 may be configured to identify key performance indicators (KPIs) in the first user metadata using the intelligent visualization configuration. Finally at step 214, the processor 106 may generate a first visual representation of the identifies KPIs.

Figure 3A:
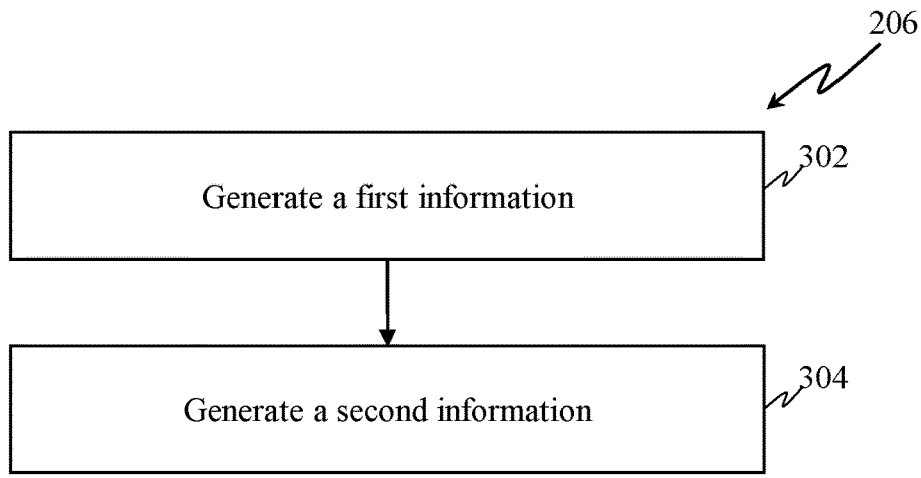
FIGS. 3A-3C are flowcharts depicting a step 206 of analyzing a first query using metadata from a database management system (DBMS), in accordance with an embodiment.
Figure 3B:
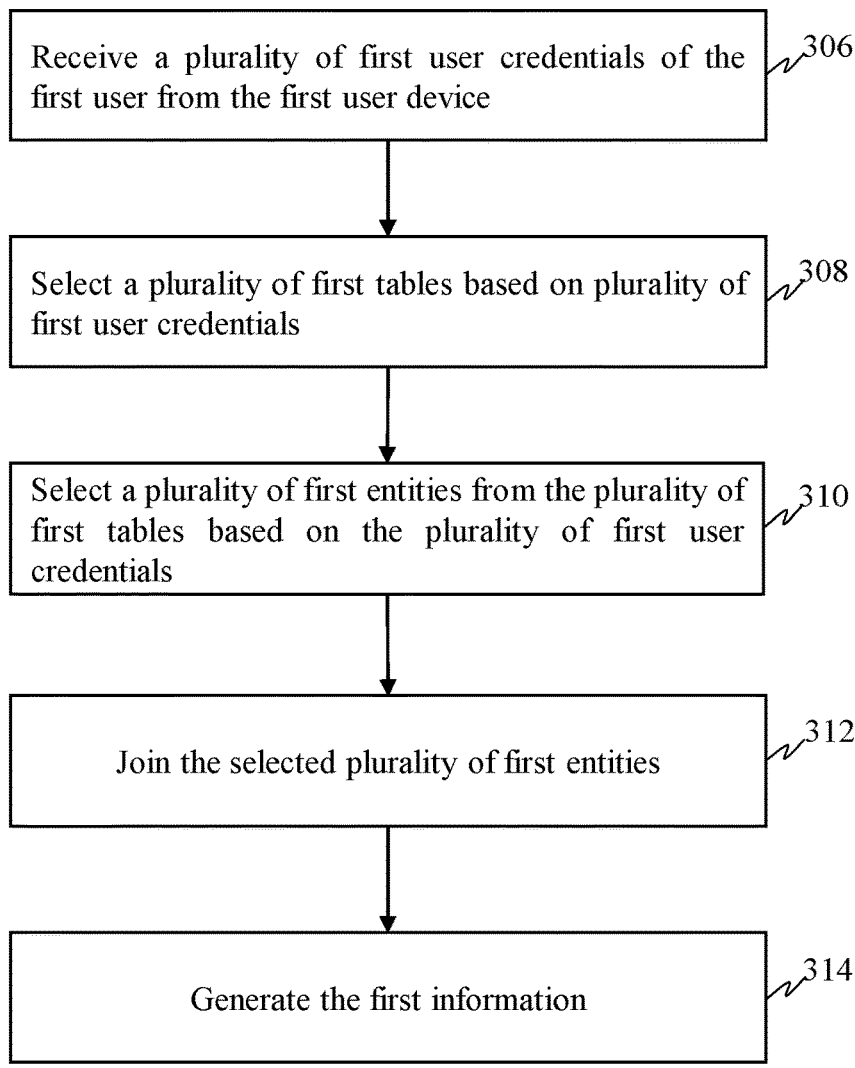
Figure 3C:
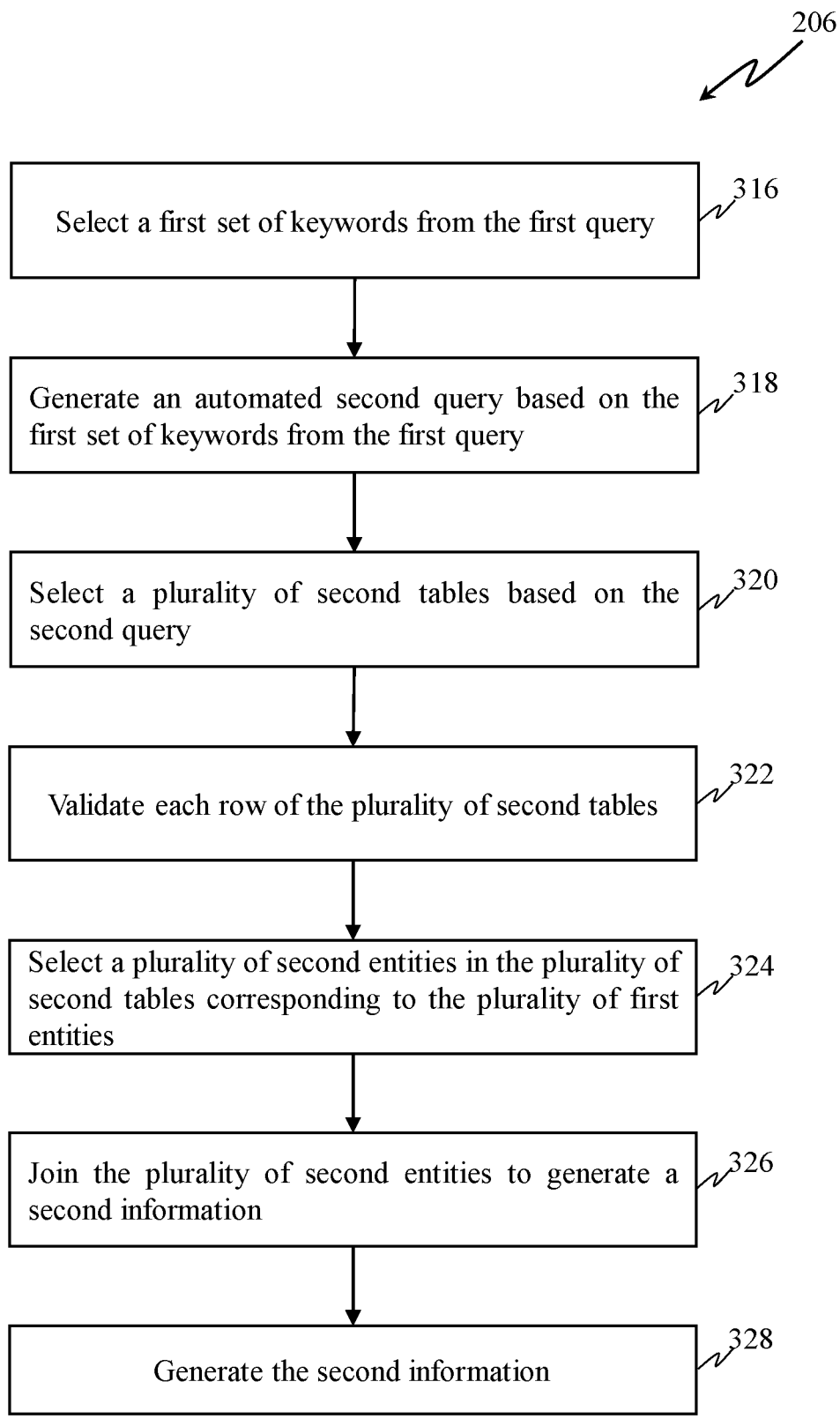

FIGS. 3A-3C are flowcharts depicting the step 206 for analyzing the first query using the metadata from the DBMS 102.

Referring to FIG. 3A, the step 206 of analyzing the first query may be implemented in two steps comprising step 302 and step 304. At step 302, the query engine 100 may be configured to generate a first information. Furthermore, at step 304 the query engine 100 may be configured to generate a second information.

Referring to FIG. 3B, the first information may be generated by the analytical query engine 100 on receiving the first query from the first user device 108. The first information may include the identity details of the first user. At step 306, the processor 106 may be configured to receive a plurality of first user credentials of the first user from the first user device 108 that may be mandatorily required. The plurality of first user credentials may include the first user's name, address, nationality, identity number, position of the user in the company hierarchy, etc. The processor 106 may then be configured to identify the data sources from where the data related to the plurality of first user credentials may be fetched. At step 308, the processor 106 may be configured to select a plurality of first tables from different accessible data sources based on plurality of first user credentials.

At step 310, the analytical query engine 100 may be configured to select a plurality of first entities from the plurality of first tables based on the plurality of first user credentials. The processor 106 may be configured to check for the permissions that may be available for the first user for accessing data sources related to the first query. The plurality of first entities may include portions of the plurality of first tables comprising individual columns that correspond to the first user credentials. At step 312, the plurality of first entities may be joined to form a single table comprising information relating to the identity details of the first user. At step 314, the analytical query engine 100 may generate the first information comprising the plurality of first entities and the permissions associated with the first user credentials for accessing the various data sources related to the first query.

FIG. 3C is a flowchart depicting a method of generating the second information. At step 316, the processor 106 may be configured to select a first set of keywords from the first query. The first set of keywords may be based on the subject matter disclosed in the first query. At step 318, the processor 106 may be configured to check for the accessibility of various data sources available in the network 104 and generate an automated second query based on the first set of keywords.

Further, at step 320, the processor 106 may be configured to select a plurality of second tables available in the network 104 based on the second query. The plurality of second tables may include column-wise data relevant to the first query. The data relevant to the first user may be available only in a particular row in each of the columns of the second table. Therefore, at step 322, the processor may be configured to check each of the plurality of second tables row-wise. Based on the validation, at step 324, the processor 106 may be configured to select a plurality of second entities in the plurality of second tables comprising columns that are validated row-wise. Also, the plurality of first entities may be used to identify the corresponding plurality of second entities. Further, the processor 106 may be configured to join the plurality of second entities at step 326 and hence generate the second information at step 328. Thus, the first information and the second information, may be used in combination to analyze the first query.

Figure 4:
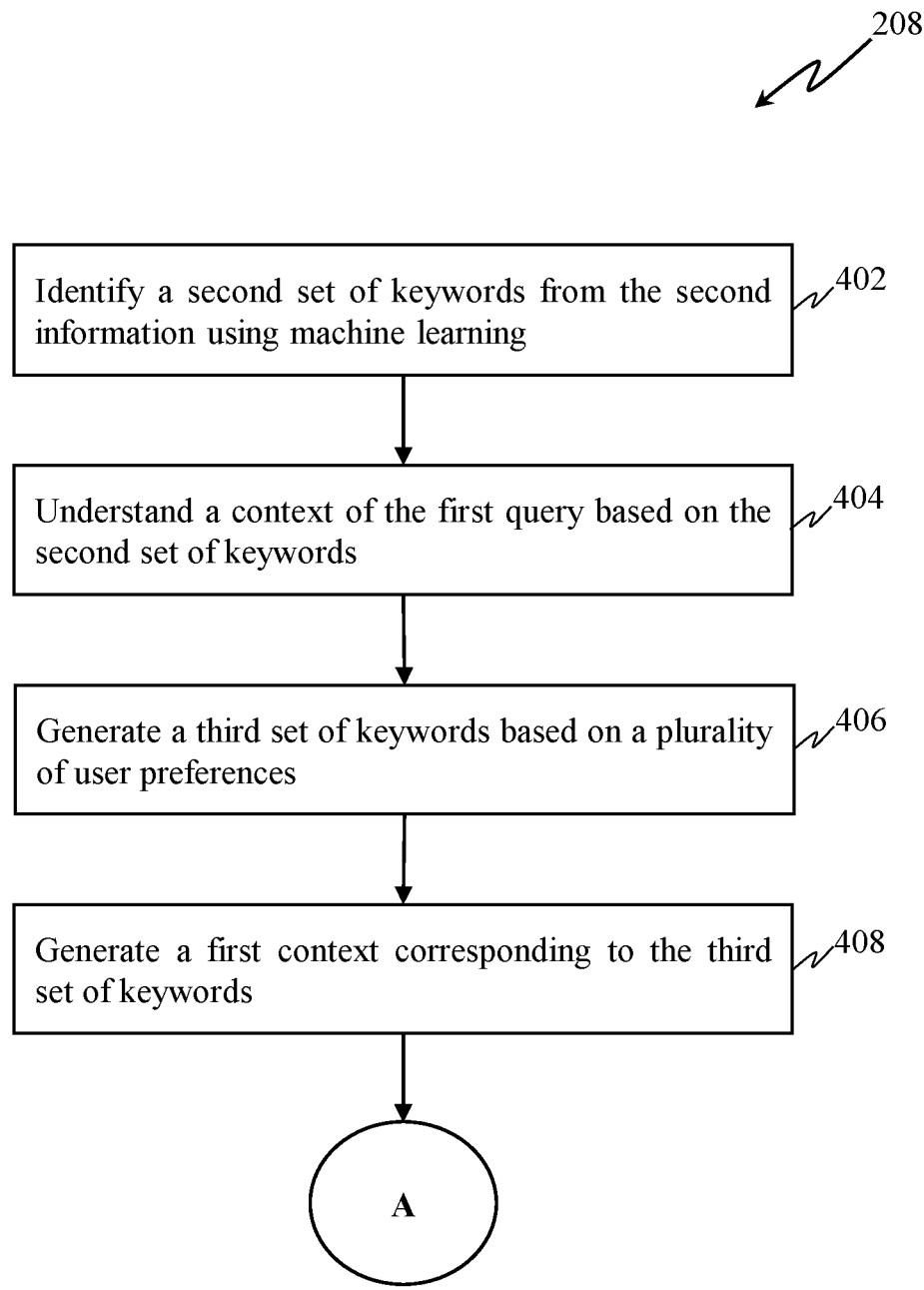
FIG. 4 is a flowchart depicting a step 208 of determining a first context of the first query, in accordance with an embodiment.

FIG. 4 is a flowchart depicting the step 208 of determining the first context of the first query. At step 402, the processor 106 may be configured to identify a second set of keywords from the second information based on the first information and the first query using depth-first-search shortest path algorithm. Further, at step 404, the second set of keywords maybe used to understand a context of the first query.

In an embodiment, for understanding the context of the first query, the second set of keywords may be used by the processor 106 to detect a plurality of historical/previous selections of the first user. Furthermore, the processor 106 may be configured to receive a plurality of user preferences from at least one detected historical/previous selection of the first user based on the first information and the second information of the first query.

Alternatively, in an embodiment, when the processor 106 fails to detect the plurality of historical/previous selections of the first user, the analytical query engine may be configured to prompt the first user to enter the relevant plurality of user preferences. The relevant plurality of user preferences thus obtained may be used to understand the context of the first query.

At step 406, a third set of keywords may be generated by the processor 106 based on the user preferences thus obtained (either from the historical selections or by prompting the first user). At step 408, the analytical query engine 100 may be configured to generate a first context that may correspond to the third set of keywords.

Figure 5:
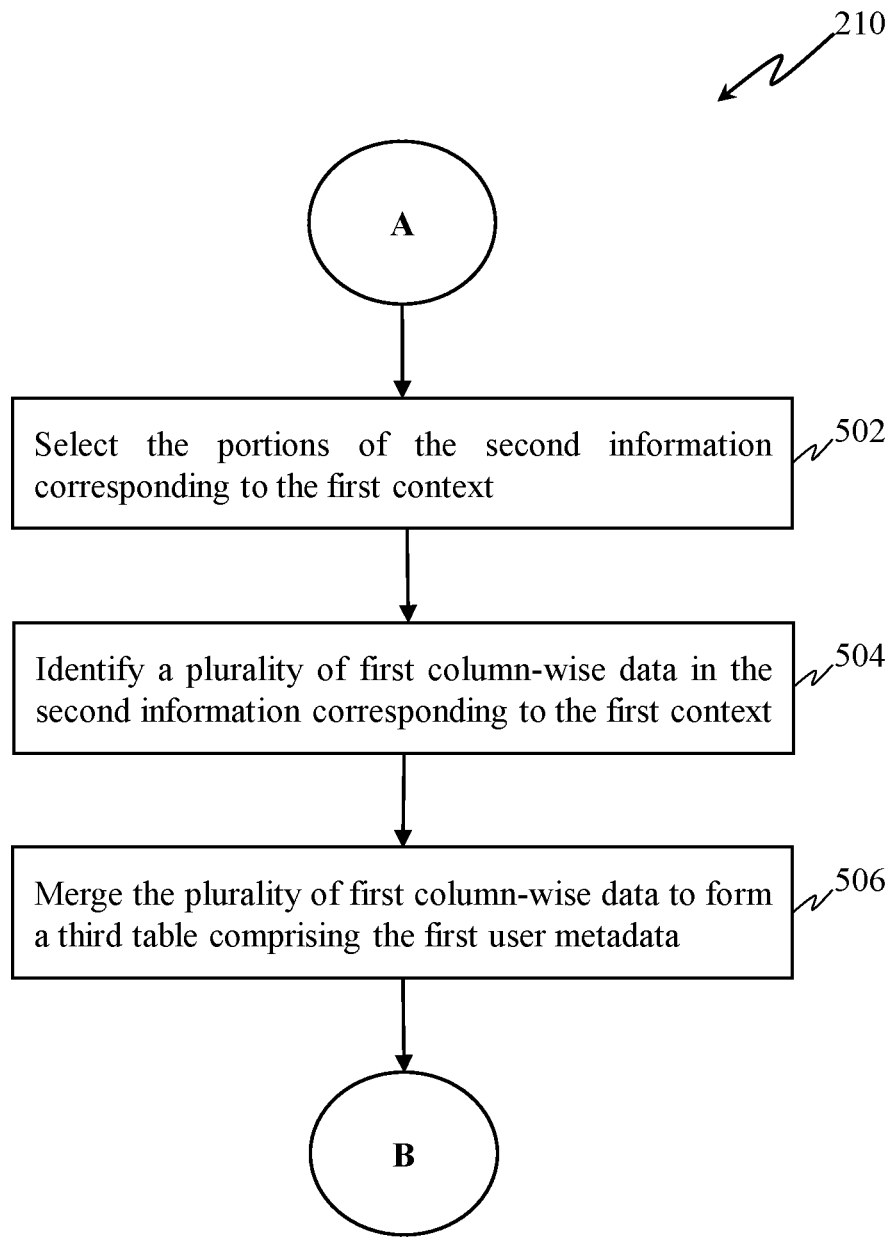
FIG. 5 is a flowchart depicting a step 210 of generating a first user metadata based on the first context, in accordance with an embodiment.

FIG. 5 is a flowchart depicting the step 210 of generating a first user metadata based on the first context. At step 502, the first context may be used as a reference to select portions the second information corresponding to the first context. Further, at step 504, the processor 106 may be configured to identify a plurality of first column-wise data in the second information corresponding to the first context. At step 506, the processor 106 may be configured to merge the plurality first column-wise data to form a third table. The third table thus formed may comprise the first user metadata.

Figure 6:
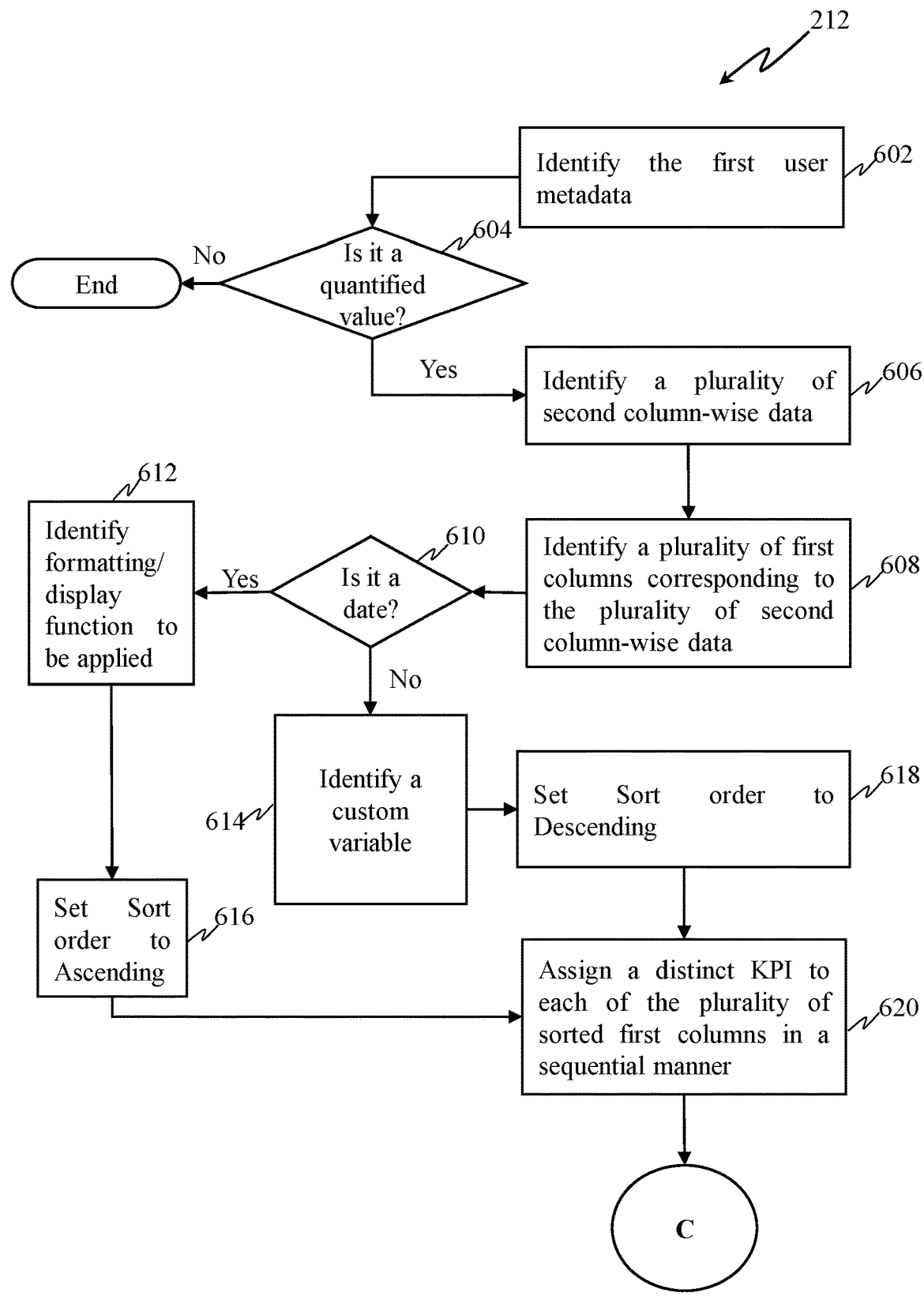
FIG. 6 is a flowchart depicting a step 212 of identifying key performance indicators (KPIs) in the first user metadata using an intelligent visualization configuration, in accordance with an embodiment.

FIG. 6 is a flowchart depicting the step of identifying the KPIs in the first user metadata using the intelligent visualization configuration. At step 602, the analytical query engine 100 may be configured to identify the first user metadata. Further at step 604, the processor 106 may be configured to check for portions of the identified first user metadata having a quantified value. The process of identifying the KPIs in the first user metadata may end when the none of the first user metadata have any more quantified values.

Referring to FIG. 6, at step 606, the processor 106 may be configured to identify a plurality of second column-wise data. The plurality of second column-wise data may be used to identify a plurality of first columns from the first user metadata, at step 608. At step 610, the processor 106 may be configured to check whether any of the identified plurality of second column-wise data in each of the first column may be a date or not. If the identified plurality of second column-wise data is a date, then a particular format and display function may be applied to sort the dates in an ascending order at steps 612 and 616 respectively.

Furthermore, at step 614, the processor 106 may be configured to identify a custom variable in the identified plurality of second column-wise data, when the identified plurality of second column-wise data is not a date. For example, the custom variable may be a complete number, like the number of sales of a particular product in a particular year in a particular region. At step 618, the custom variables in each of the first columns are sorted to be arranged in a descending order.

At step 620, the processor 106 may be configured to assign a distinct KPI (in an ascending order) to each of the first columns comprising the sorted data that may be either the dates or any of the custom variables. The KPIs may be assigned in such a manner that the first column that may be assigned the first KPI may be the most relevant to the first query and the first column that may be assigned the last KPI may be the least relevant to the first query. The arrangement of the KPIs in combination with the first context may be used by the processor to build and generate an automated secondary query that may be configured to fetch data with greater relevance to the first query.

Figure 7:
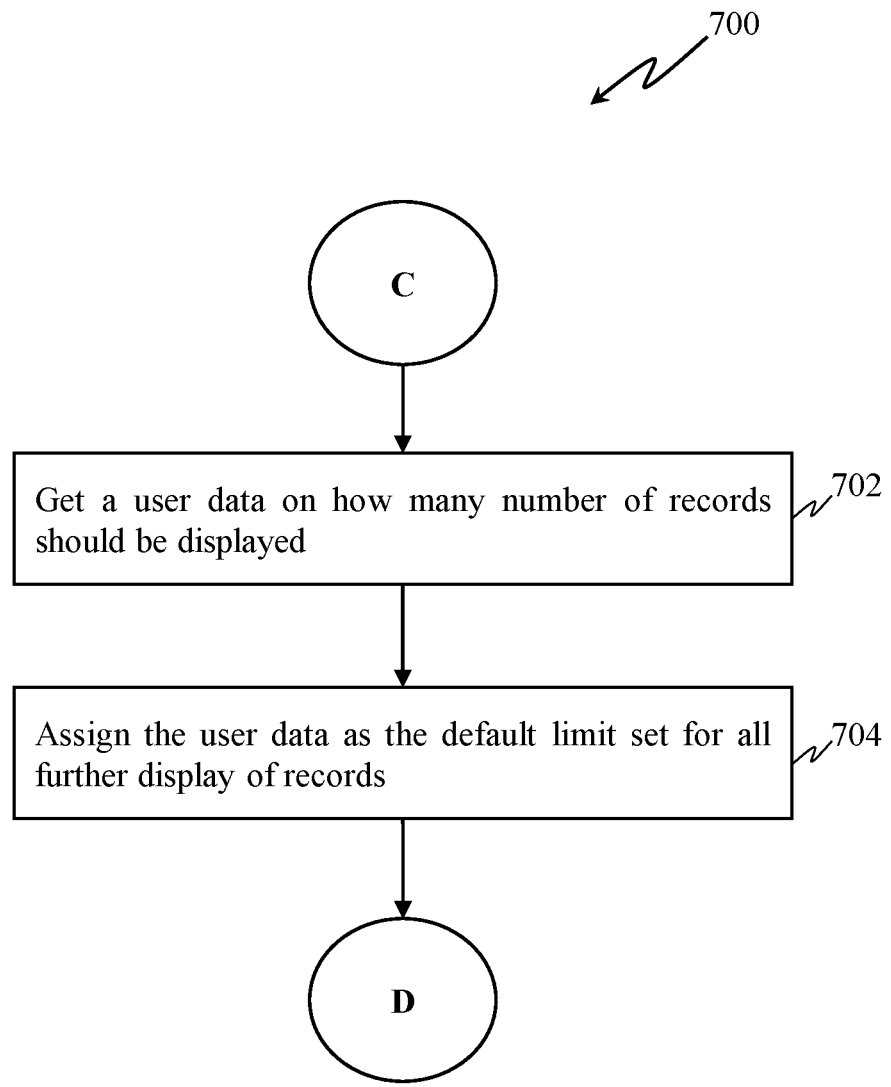
FIG. 7 is a flowchart 700 depicting a method of assigning a limit on number of records that should be displayed, in accordance with an embodiment.

FIG. 7 is a flowchart 700 depicting a method of assigning a limit on number of records that should be displayed. At step 702, the analytical query engine 100 may be configured to prompt the user to provide a user data regarding the number of records that needs to be displayed at any instant. For example, if the number of KPIs assigned may be 1 to 100, then the user may select to view records corresponding to 10 KPIs at a time starting from 1. At step 704, the user defined number of records may be set as the default limit set for the user for all further display of records.

Figure 8:
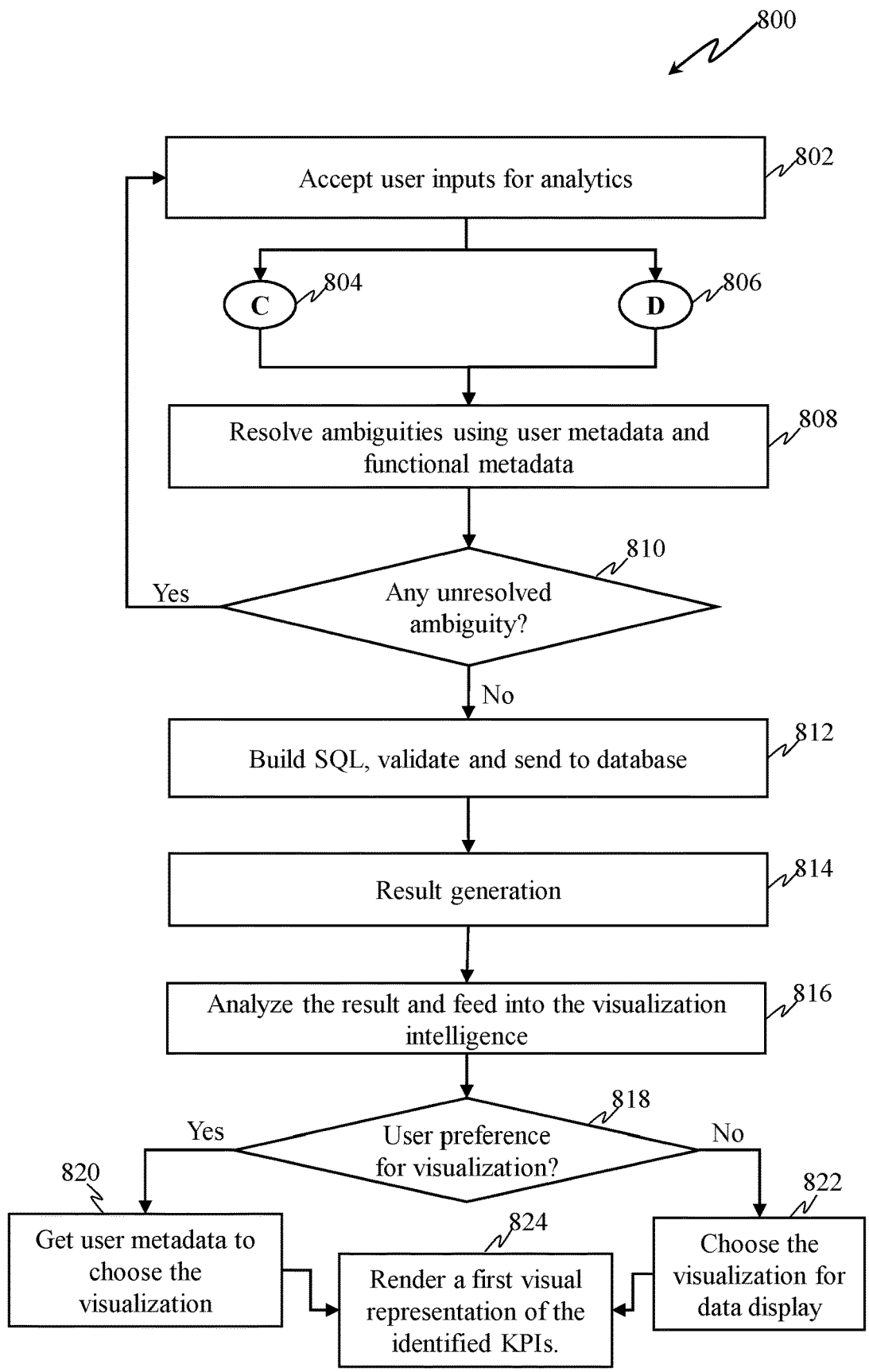
FIG. 8 is a flowchart 800 depicting a method for the step of generating a first visual representation of the identified KPIs, in accordance with an embodiment.

FIG. 8 is a flowchart 800 depicting a method for the step of generating the first visual representation of the identified KPIs. At step 802 the engine 100 may be configured to accept user inputs for analytics. At step 804, the processor 106 may receive the identified KPIs. Further, at step 806, the processor may receive the limit set obtained from the user. At steps 808 processor 106 may resolve any ambiguities in the KPIs (if any). At step 810 the processor 106 may check for any other unresolved ambiguities and resolve the same. At step 812, the analytical query engine 100 may build a context-based query in a structured query language (SQL). The SQL query may be sent to the DBMS 102. At step 814, the DBMS 102 may generate a result of the SQL query that may be the relevant to the context of the first query.

At step 816, the analytical query engine may be configured to analyze the result using an intelligent visualization configuration. The intelligent visualization configuration may be configured to render a graphical representation of the result. At step 818, the visualization configuration may be configured to check for any user-based preferences to choose the type of graphical representation and obtain the user metadata for the same. The visualization configuration may be configured to request the user to enter the user metadata relating to the type of visual representation preferred by the user, at step 820. Else, at step 822, the visualization configuration may be configured to automatically choose a suitable graphical representation as the first visual representation of the identified KPIs, that may depend on the context of the first query. The visualization configuration may be configured to render the first visual representation of the identified KPIs at step 824.

The various embodiments have been described using detailed descriptions that are provided by way of example and are not intended to limit the scope of the invention. The described embodiments comprise different features, not all of which are required in all embodiments. Some embodiments utilize only some of the features or possible combinations of the features. Many other ramification and variations are possible within the teaching of the embodiments comprising different combinations of features noted in the described embodiments.

It will be appreciated by persons skilled in the art that the various embodiments are not limited by what has been particularly shown and described herein above. Rather the scope of the invention is defined by the claims that follow.

What is claimed is:

1. A method for performing context-based data analysis, the method performed by at least one processor, the method comprising:
   receiving a first query from a first user on a first user device;
   sending the first query from the first user device to a database management system (DBMS) over a network;
   analyzing the first query using metadata from the DBMS, the step of analyzing the first query using metadata from the DBMS comprises:
      generating a first information, wherein the method for generating the first information further comprises:
         receiving a plurality of first user credentials of the first user;
         selecting a plurality of first tables based on the plurality of first user credentials;
         selecting a plurality of first entities from the plurality of first tables based on the plurality of first user credentials; and
         joining the selected plurality of first entities to generate a single table comprising the first information for the first user; and
      generating a second information, wherein the method for generating the second information further comprises:
         selecting a first set of keywords from the first query;
         generating an automated second query based on the first set of keywords from the first query;
         selecting a plurality of second tables based on the second query;
         validating each row of the plurality of second tables using a row-level security check, wherein the row-level security check comprises selecting a plurality of second entities in the plurality of second tables corresponding to the plurality of first entities of the first information; and
         joining the selected plurality of second entities to generate the second information;
   determining a first context of the first query, wherein determining the first context of the first query comprises:
      identifying a second set of keywords from the second information using machine learning;
      understanding a context of the first query based on the second set of keywords, wherein understanding the context of the first query comprises obtaining a plurality of user preferences, wherein the method of obtaining the plurality of user preferences comprises:
         detecting at least one previous selection of the first user based on the second set of keywords and receiving the plurality of user preferences from at least one previous selection of the first user based on the first information and the second information;
      generating a third set of keywords based on the plurality of user preferences obtained; and
      generating the first context corresponding to the third set of keywords;
   generating a first user metadata based on the first context of the first query;
   identifying key performance indicators (KPIs) in the first user metadata using an intelligent visualization configuration; and
   generating a first visual representation of the identified KPIs.

2. The method for performing context-based data analysis as claimed in claim 1, wherein the step of generating the first user metadata based on the first context comprises applying a first filter to select portions of the second information corresponding to the first context, wherein applying the first filter comprises:
   identifying a plurality of first column-wise data in the second information corresponding to the first context; and
   merging the plurality of first column-wise data to form a third table comprising the first user metadata.

3. The method for performing context-based data analysis as claimed in claim 2, wherein the step of identifying the key performance indicators (KPIs) in the first user metadata using the intelligent visualization configuration comprises:
   identifying a plurality of second column-wise data from the first user metadata, wherein the plurality of second column-wise data comprises quantified values of the first user metadata;
   identifying a plurality of first columns corresponding to the plurality of second column-wise data;
   sorting the quantified values within each plurality of first columns in descending order;
   sorting the plurality of first columns in descending order based on the first context such that the first column in the beginning of the sorted plurality of first column is most relevant to the first context and the first column in the end of the sorted plurality of first column is the least relevant to the first context; and
   assigning a distinct KPI to each of the plurality of sorted first columns in a sequential manner.

4. The method for performing context-based data analysis as claimed in claim 3, wherein generating the visual representation of the identified KPIs comprises choosing a visual representation that is most relevant to the first KPI.

* * * * *